United States Patent [19]

Tilleman

[11] Patent Number: 5,680,120
[45] Date of Patent: Oct. 21, 1997

[54] TRANSPORTATION SAFETY APPARATUS AND METHOD

[75] Inventor: Michael M. Tilleman, Rehovot, Israel

[73] Assignee: Aspen Systems Inc., Marlborough, Mass.

[21] Appl. No.: 680,430

[22] Filed: Jul. 12, 1996

[51] Int. Cl.⁶ .......................................... B60Q 1/00
[52] U.S. Cl. .................. 340/904; 340/436; 340/557; 246/25; 246/13; 246/106; 246/33 A; 246/115; 246/124; 246/167 R; 246/182 R; 246/182 A
[58] Field of Search .................. 340/904, 436, 340/903, 435, 901, 988, 557; 246/122 R, 124, 167 R, 182 R, 182 A, 246, 25, 13, 106, 33 A, 115

[56] References Cited

U.S. PATENT DOCUMENTS

| | | | |
|---|---|---|---|
| 3,725,699 | 4/1973 | Pascoe | 246/112 |
| 3,813,538 | 5/1974 | Thorne-Booth | 246/167 D |
| 4,039,916 | 8/1977 | Selam | 246/41 |
| 4,128,218 | 12/1978 | Pohlig | 246/247 |
| 4,524,931 | 6/1985 | Nilsson | 246/167 D |
| 4,735,384 | 4/1988 | Elliott | 246/167 D |
| 5,030,840 | 7/1991 | Sommen | 250/561 |
| 5,364,047 | 11/1994 | Petit et al. | 246/122 R |

*Primary Examiner*—Thomas Mullen
*Assistant Examiner*—Nina Tang
*Attorney, Agent, or Firm*—Bruce F. Jacobs; Diderico Van Eyl

[57] ABSTRACT

A transportation safety apparatus and method for the detection of obstacles which lie off the line-of-sight or beyond the field of view of a moving vehicle entails shooting a laser beam through the air from a moving vehicle, capturing the beam and passing it to a fiberoptic relay which transmits a laser pulse to a distant site, and receiving a reflection thereof if the site is clear of obstacles. The pulses are received within about 10–20 microseconds per kilometer of relay length from the time of launching, permitting monitoring of the probe-site in real-time.

44 Claims, 7 Drawing Sheets

TRANSPORTATION SAFETY APPARATUS AND METHOD

BACKGROUND OF THE INVENTION

The present invention relates to the field of transportation safety, particularly to the detection of obstacles which lie off the line-of-sight or beyond the field of view of a moving transportation vehicle, e.g. a railroad train.

The identification of blockages of railroad tracks in sufficient time to permit a train to make an emergency stop are becoming more and more important as the speed of trains increases. The high speed train of today can now travel up to 300 km/hr. A train traveling at such a speed requires 5 km or more to execute an emergency stop. Thus the ability to identify track blockages due to landslides, a vehicle blocking a railroad crossing, a stopped train on the track ahead, or the like, is becoming more and more critical.

When a blockage is in the direct line-of-site of a moving vehicle, techniques based upon traditional radar, e.g. laser radar (ladar), have been utilized to identify the existence of a blockage. However, no suitable technique currently is available to identify the existence of a blockage which is not within the direct line-of-site of a railroad train. Unlike the traditional systems that operate by transmitting and receiving signals along a direct line-of-sight, the present invention overcomes that constraint.

Accordingly, it is an object of the present invention to identify the presence of obstacles or blockages on a roadway in sufficient time to permit a safe emergency stop, when the obstacles or blockages are not in the direct line-of-site of a moving vehicle.

It is a further object to monitor a railroad track several kilometers ahead of an approaching train to warn for obstacles.

It is a still further object to utilize an eye-safe laser radar to warn a transportation vehicle of the existence of a road lockage when that blockage is not in the line-of-sight of the vehicle.

These and still further objects will be apparent from the following description of the present invention.

SUMMARY OF THE INVENTION

The present invention is directed to an electro-optic transportation warning system which operates by transmitting an optical signal from a moving vehicle through air to a fiberoptic cable relay, one end of which comprises a collimating means to receive the outgoing optical signal and the other end of which is connected to a probe means to scan a given air path which is out of the direct line-of-site of the moving vehicle. A return signal from the probe means is either retroreflected or collected and transmitted to the moving vehicle. If an obstacle is present in the scanned path then the return signal will be obstructed in whole or in part and a warning can be triggered in sufficient time to allow the moving vehicle to stop safely prior to the obstacle.

BRIEF DESCRIPTION OF THE DRAWINGS

The present invention can be better understood by reference to drawings in which.

DETAILED DESCRIPTION OF THE PREFERRED EMBODIMENTS

Figure 1:
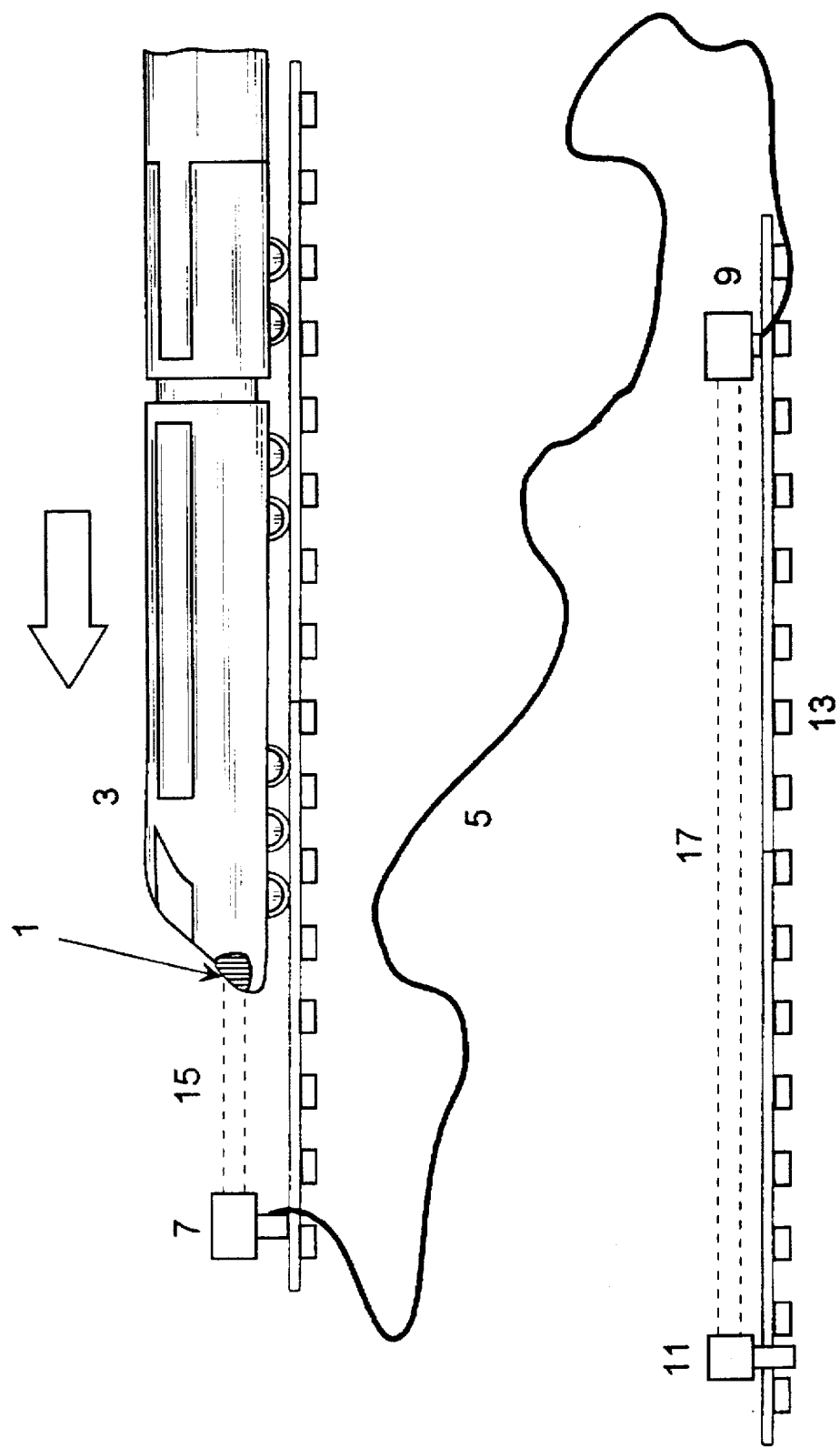
FIG. 1 is an illustration of the use of an apparatus of the present invention wherein a transceiver mounted on a train transmits a laser beam through the air into a receiving port which is connected to a remote probe port on one side of a probe site by means of a fiberoptic cable. Retroreflectors are located on the opposite side of the probe site.

The transportation warning system of this invention serves to detect obstacles in the path of a moving vehicle which moves in a controlled path and to avoid a collision with those obstacles. The invention can be applied as a safety system for any moving vehicle which operates along a specific path which must be totally unobstructed. For example, the safety system may be applied to railroad trains which operate on a fixed track (including freight, passenger, and high-speed system trains), magnetically levitated vehicles which operate on a fixed track, airplanes which take-off and land on a fixed runway path, or the like. The system consists of three subsystems: a transceiver (transmitter/receiver) mounted on the moving vehicle, one or more relays/ports deployed along the specific path which the vehicle will use, and one or more obstacle detectors at probe sites. In operation, a moving vehicle will emit a laser beam signal through the air. The signal is picked up by a receiving port within the line-of-site of the vehicle. The receiving port includes a means for collimating the laser signal and couples the signal into a fiberoptic relay. The fiberoptic relay transmits the laser signal an extended distance ahead of the moving vehicle, for example for several kilometers of track ahead of a train or to a runway to be used by an airplane. The fiberoptic relay is coupled to an exit port which directs the laser signal into a retroreflector diagonally across a portion of the path to be probed. The presence of any obstacle, e.g. a rockslide, a stalled train, a rock inside a tunnel which has fallen from the roof, a blocked grade crossing, a truck or another airplane on a runway, or the like, on the portion of the path being probed is registered as an obstruction to the laser beam. The retroreflected laser signal retraces its path back to the moving vehicle. The returning laser signal is then interpreted by logic residing on the vehicle to determine if an obstacle is present. If an obstacle is identified, an alarm is sounded on the vehicle within milliseconds of the launch of the original laser beam.

Lasers that are least hazardous to the human eye lie in the range of about 1.5–2.1 micrometers (µm), of which the lower bound wavelength is the safes. While any laser may be used, preferably an eye-safe laser is used. More preferably, the eye-safe laser is a semiconductor laser-diode of the InGaAsP type emitting pulses of tens of Watts at a wavelength of 1.55 µm. Radiation at this wavelength provides two major advantages: (1) the radiation is the most eye-safe and (2) the optical signal is the least lossy on propagation in silica fiberoptic cables.

The laser signal is emitted from a vehicle-mounted transceiver and launched into air with an expansion angle of up to about 5°, preferably at an angle of about 0.5° to 3°, more preferably at an angle of about 1°. The laser signal traverses an extended distance of air before being collected by a receiving port and fed to a fiberoptic cable. The distance is generally at least 1 m and may extend for 1 km or more in an especially clear atmosphere. Preferably, the distance is about 1 to about 500 m. More preferably it is about 10 to about 300 m.

To permit a sufficiently strong return signal to discriminate between a clear path and an obstacle at the probe site, a strong initial signal is necessary. However, the signal strength is limited by the availability of lasers and safety hazards based thereon. Thus, the targeting of the initial signal into the fiberoptic relay is important. To accomplish accurate targeting while using as low an initial signal strength as possible, the laser beam is collimated at the receiving port. This can be accomplished by use of any suitable collimating means such as a gradient refractive index (GRIN) or a microscope objective lens. Preferably a GRIN lens is used ahead of or as part of the coupler to the fiberoptic cable since it relaxes the required alignment from microradians to milliradians, i.e. by one thousand-fold. In the absence of a collimating means to receive the laser signal and focus it into the fiberoptic cable, the laser signal could either miss the desired target completely or be reduced to the noise level.

It has also been found beneficial to modify a conventional fiberoptic cable for use herein to reduce the signal loss due to reflectance from a normal value of about 4% to less than about 1%, preferably to less than 0.5%. A suitable method for so doing has been found to be coating the tips of the fibers in the cable with an anti-reflection coating. A preferred such coating is magnesium fluoride which has high durability and a desirable refractive index of about 1.378 (at 1.55 µm). This allows matching of the impedance between the air and glass. The coating may be applied by thin film deposition techniques performed under high vacuum.

The fiberoptic relay may be single-mode or multi-mode. The end of the fiberoptic relay at the probe site is terminated by a second coupler which can be a single lens-like device similar to or the same as the first coupler. Preferably, a 1×N star connection to N lens-like devices is used so that the transmission signal is split several (N) ways into N individual optical fibers. To separate temporally the spatially separated pulses the fibers should have gradually different lengths, thus forming a time delay between successive signals. Thus, at the probe site the relay forms N parallel outcoupled beams, having an aperture and a total width covering the width of the probed path. Across the probed path is positioned a signal receiving means. The signal receiving means is preferably an array of retroreflectors to retroreflect the signal, i.e. causing it to retrace its path to the detector in the transceiver. Alternatively, however, the signal receiving means may be an array of detectors across the probed path which can transmit an electronic signal to the moving vehicle by radio or microwave. Also alternatively, the signal receiving means may be an array of couplers to a second fiberoptic relay so that an optical signal is transmitted back to the moving vehicle through the second fiberoptic relay and couplers.

The laser signal exiting the fiberoptic cable is preferably coupled to a collimating means to deliver a high intensity signal to the probe site. In the absence of such a collimating means, the laser beam will diverge rapidly. Consequently the intensity of the signal will decrease and the probability of detection may be compromised, particularly under adverse weather conditions.

Suitable retroreflectors for use herein are preferably retroreflector prisms (corner cubes) or three-mirror assemblies. In both cases, three flat surfaces form a mutually orthogonal corner. The accuracy of the orthogonality is significant for the parallelism of the incident and reflected beams to each other. To permit an efficient reflection and coupling of the laser beam into the fiberoptic relay, the parallelism should be about 30 to 0.5 arc sec, preferable about 1 arc sec or lower.

The warning system of this invention can be deployed with a single probe unit to warn about a specific probe site such as a railway grade crossing. Alternatively, the system may include a series of units covering a series of probe sites, including the entire length of the path to be traversed by the vehicle or a major or minor section thereof.

If a probe site is unobstructed, the temporal and spatial intensity profiles of the optical signals returning to the moving vehicle will remain similar to those launched. However, if an obstacle (obstacles) obstruct the path or a fraction thereof, then the intensity profiles of the optical signal (signals) will be drastically modified, and their power will be severely reduced, up to the point of complete extinction. Upon processing of a returning signal such a modification or reduction in power will register as the detection of an obstacle which will be followed by the issuance of a warning. The signal processing can be either analog or digital; in the former case the drop in the signal can be analyzed by a comparator (comparators) and in the latter case the comparison can be numerical.

A preferred processor is an electronic analog processor containing electronic amplifiers, comparators, and a clock. The processor scans the sequence of signals and detects if one or more signals are missing. If a signal is missing, an alarm can be indicated by light, sound, or both.

FIG. 1 presents an illustration of a particular example of the use of an apparatus of this invention with a railroad train. A transceiver 1 is mounted on a train 3 and a fiberoptic relay 5, its couplers 7 and 9 and retroreflectors 11 are deployed at the probe site 13. From the moving train 3, the transceiver 1 emits an eye-safe laser beam 15 that is picked up by a coupler port 7 along the track over an extended air path. Coupled into the fiberoptic relay 5, a laser signal 17 is conveyed along several kilometers of track ahead of the train. The signal 17 emerges from a second coupler 9 to scan the probe site 13 diagonally across the railroad track, being incident on an array of retroreflectors 11. Once retroreflected the laser beams 17 retrace their path to the transceiver 1. The returning laser signal is interpreted by the logic residing on the train 3 to determine whether an obstacle is present. The presence of an obstacle is registered as an obstruction to the laser beam. If an obstacle is identified, an alarm is sounded within microseconds of the launch of the original laser beam.

Various embodiments of suitable apparatus of the present invention are illustrated in FIGS. 2–6, in which the same identification numbers have been assigned to the same elements. The basic arrangement includes a laser emitting at the eye-safe wavelength of 1.55 mm, a fiberoptic cable relay terminated by lens-like couplers, a receiver with detectors, and a processor.

Figure 2:
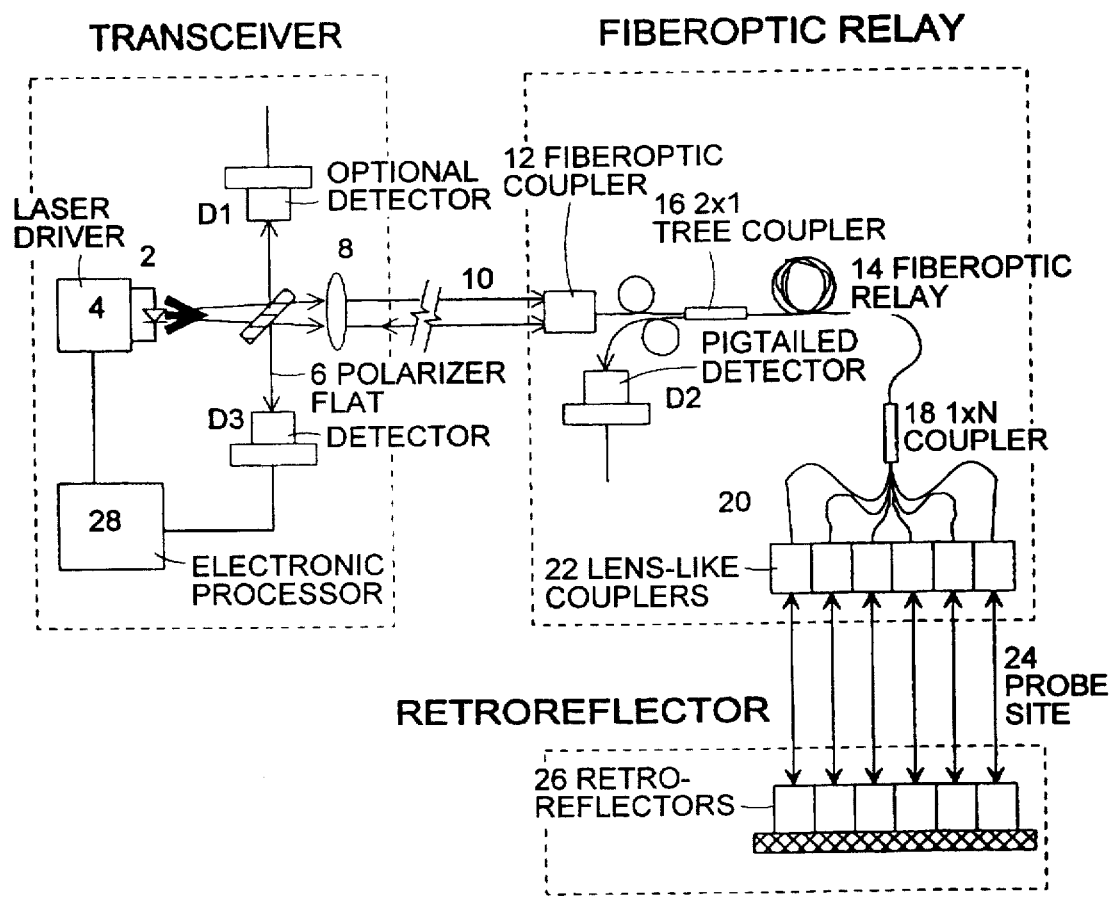
FIG. 2 is a schematic of an apparatus according to the invention in which an external transceiver emits a laser beam on a launch path through air into a coupler to a fiberoptic relay to generate an outcoupled beam which scans a probe site and is retroreflected into a fiberoptic relay retracing on the launched path into the transceiver.

FIG. 2 is a schematic of an apparatus according to the invention in which an external transceiver shines a laser beam on a launched path through air into a coupler to a fiberoptic relay to generate an outcoupled beam which scans a probe site and is retroreflected into a fiberoptic relay retracing on the launched path into the transceiver. A laser 2 driven by a laser driver 4 emits a beam propagating through a beam splitting polarizer flat 6. The laser beam is linearly p polarized, thus it is mostly transmitted through the polarizer flat 6 while only a small fraction is reflected towards an optional detector D1 which permits monitoring of the launched laser beam. The launched laser beam is collimated by lens 8 and then traverses an extended air path 10 to a fiberoptic coupler 12 where it is coupled into a fiberoptic relay 14 via a 2×1 tree coupler 16. This tree coupler splits the fiberoptic signal in the reverse direction such that a returning signal is monitored by a pigtailed detector D2. The signal in the fiberoptic relay 14 is split six ways via a 1×N coupler 18 connected to fiberoptic cables 20, which are gradually longer with respect to one another, such that a time delay is formed. The six beams are outcoupled by lens-like couplers 22, thus the emerging laser beams scan a probe site 24 and are retroreflected by an array of retroreflectors 26, into the fiberoptic relay 14 retracing on the launched path into the transceiver. In a pulsed mode of operation, due to the time delay amongst the fiberoptic cables 20, the six parallel laser pulses become temporally resolved. As the reflected laser beam returns to the transceiver, it is depolarized. To permit the utilization of a single lens set, the depolarized signal is polarized by passing through polarizer flat 6 which results in about half of the energy arriving at a detector D3. The signal is then analyzed by an electronic processor 28 which issues a warning if the returning electronic signal indicates the presence of an obstacle at the probe site 24.

Figure 3:
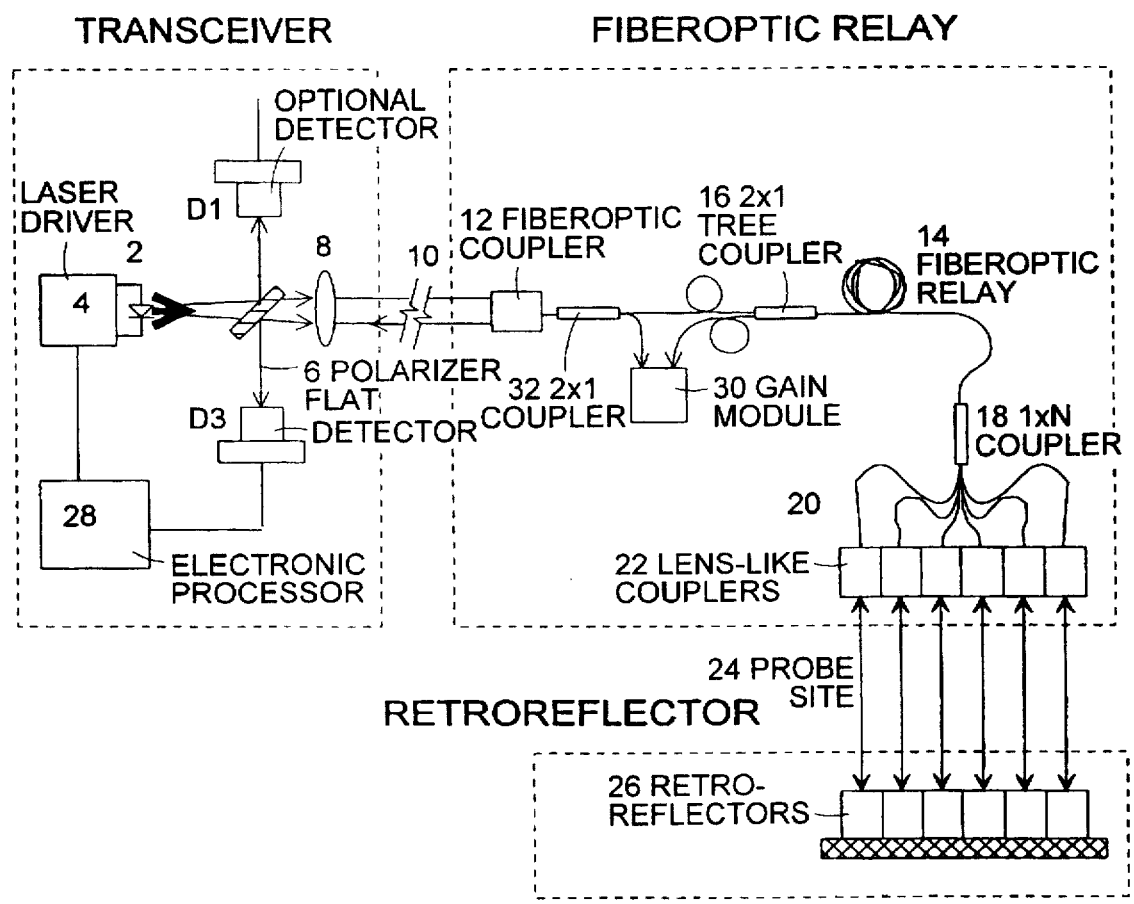
FIG. 3 is a schematic of a modified apparatus of FIG. 2 further including a gain module in the fiberoptic relay.
Figure 7:
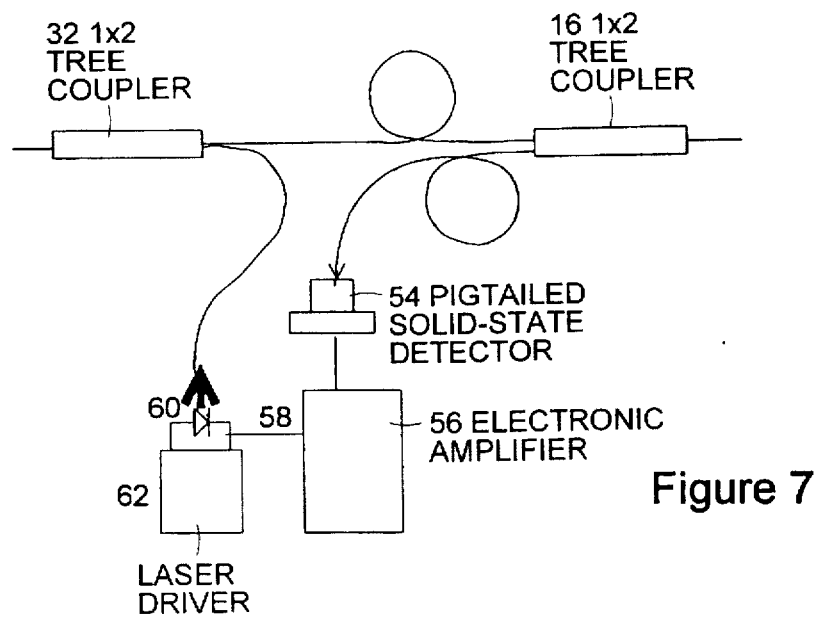
FIG. 7 is a schematic of a gain module.

FIG. 3 is a schematic of an embodiment of the invention which is similar to that of FIG. 2 but incorporates into the fiberoptic relay 14 a device, i.e. a gain module 30, to replicate the retroreflected signal at a higher optical intensity. Any suitable amplification device may be used. Generally, a unidirectional gain module as shown in FIG. 7 described in detail below is used. Incorporation of a gain module allows one or more of: the emission of a smaller laser energy, the extension of the distance to the probe site, and operation under more attenuating weather conditions. As shown in FIG. 3, a 2×1 tree coupler 32 is added to the 2×1 tree coupler 16, such that the gain module 30 is bypassed by the launched laser signal. Although not shown and not generally necessary, a gain module could be used to replicate the propagating laser signal in the same manner.

Figure 4:
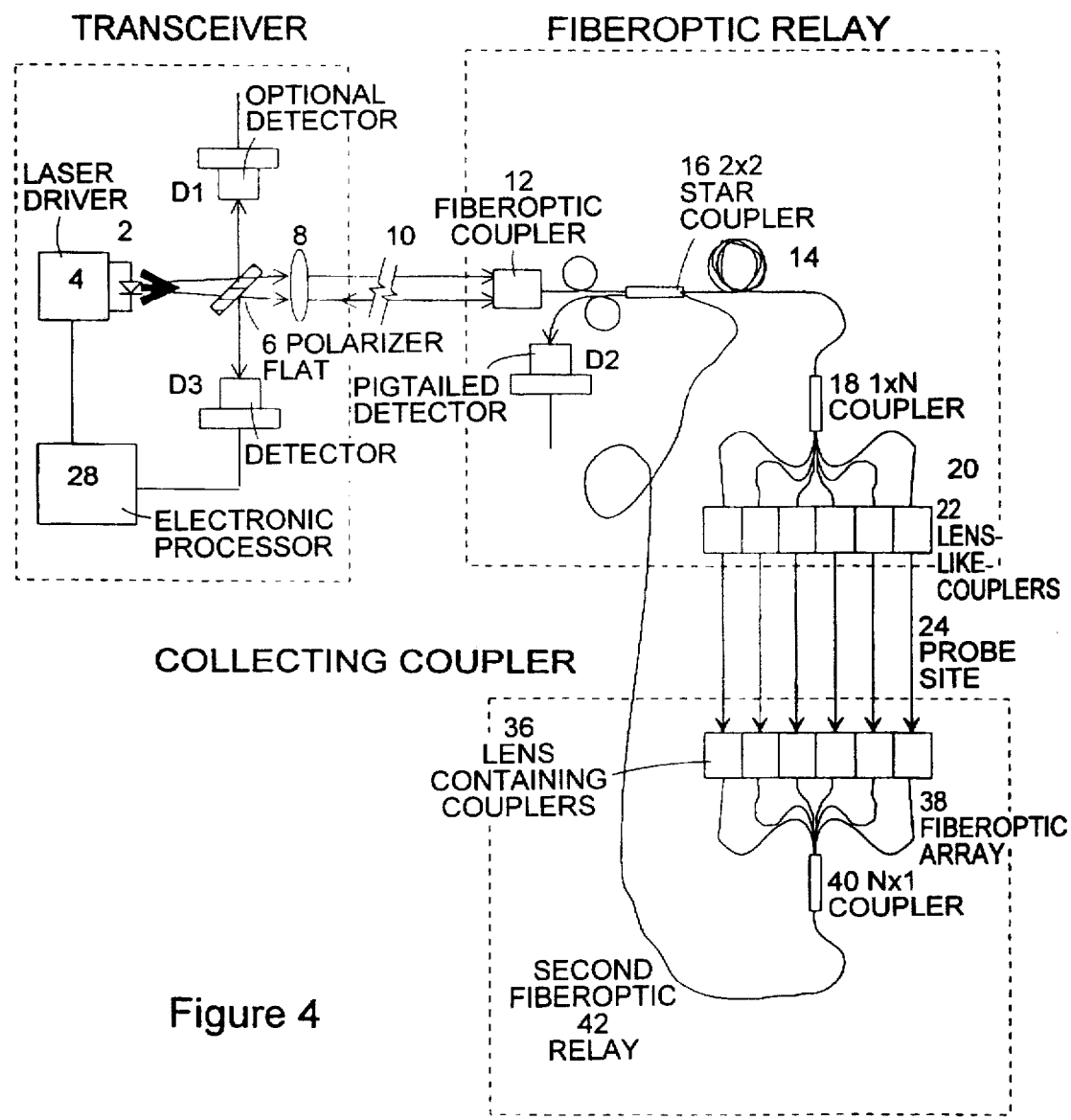
FIG. 4 is a schematic of a modified apparatus of FIG. 2 in which an external transceiver emits a laser beam on a launch path through the air into a fiberoptic relay to generate outcoupled beams which scan a probe site. The outcoupled beams are reflected by being collected by a lens-like coupler into a second coupler to the fiberoptic relay and then retracing the launched path into the transceiver.

Alternatively, the signal from the probe site may be collected by a collecting coupler and transmitted to the moving vehicle by a second fiberoptic relay as shown in FIG. 4. The components are the same as in FIG. 2 with the exception that coupler 16 is a 2×2 star coupler. The six beams outcoupled laser beams scan the probe site 24 and are collected by an array of lens-containing couplers 36 into a fiberoptic array 38 conflowing via an N×1 coupler 40 into a second fiberoptic relay 42. The relay 42 connects into the 2×2 star coupler 16 and then retraces on the launched path into the transceiver as shown in FIG. 2.

Figure 5:
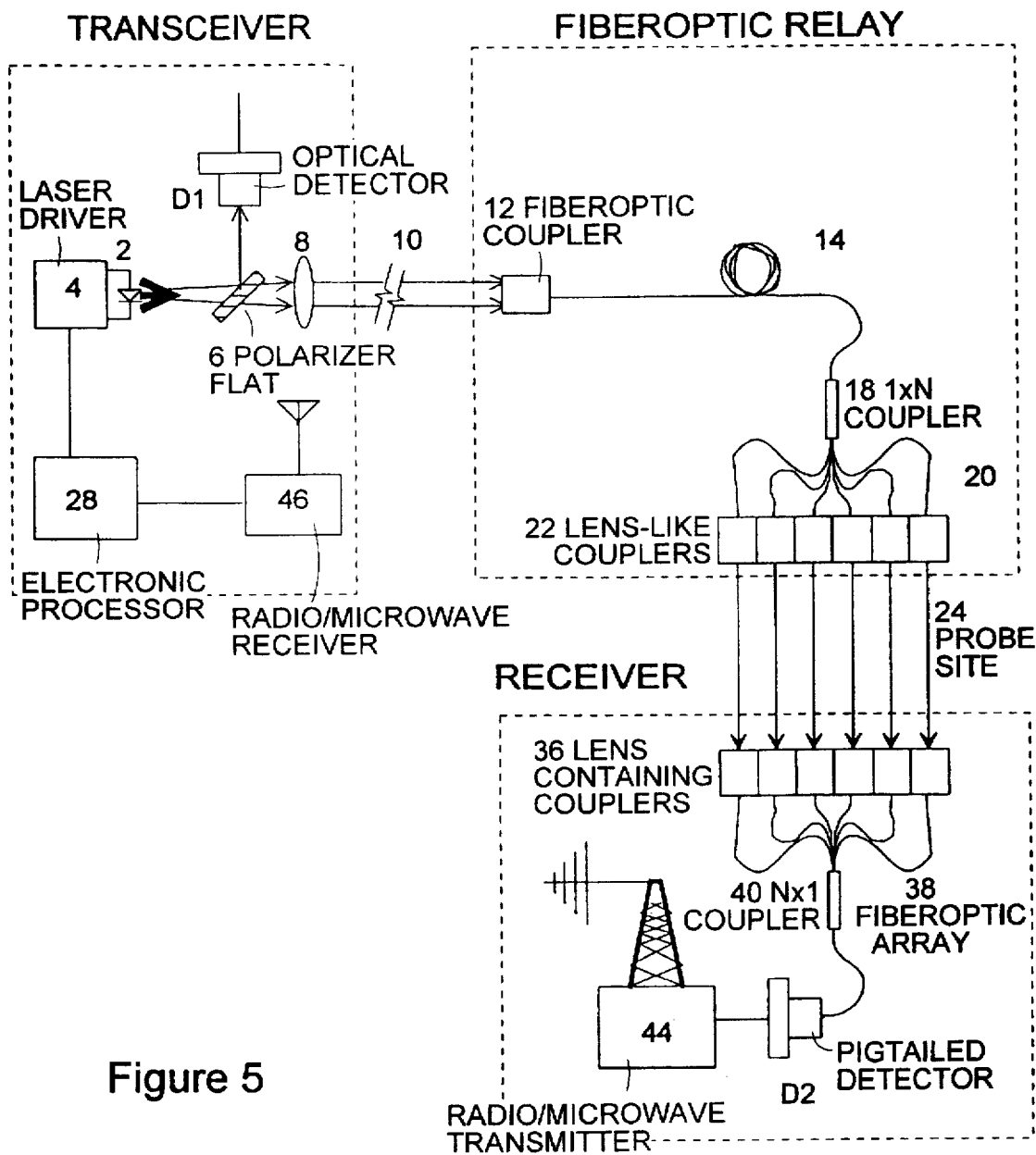
FIG. 5 is a schematic of a modified apparatus of FIG. 2 in which an external transceiver emits a laser beam on a launch path into the fiberoptic relay generating outcoupled beams which scan a probe site and are collected by a lens-like coupler, via a fiberoptic relay into a detector which transmits an electronic signal to the transceiver by radio or microwave.

Alternatively, the signal from the probe site may be transmitted from the probe site to the moving vehicle by radio or microwave as shown in FIG. 5. The components are substantially the same as in FIG. 4, except that from the N×1 coupler 40 the optical signals directly conflow to the pigtailed detector D2 and the electronic signal propagates to the radio or microwave transmitter 44. The transmitted radio or microwave optical signal is received by the radio or microwave receiver 46 and is conveyed to the electronic processor 28.

Figure 6:
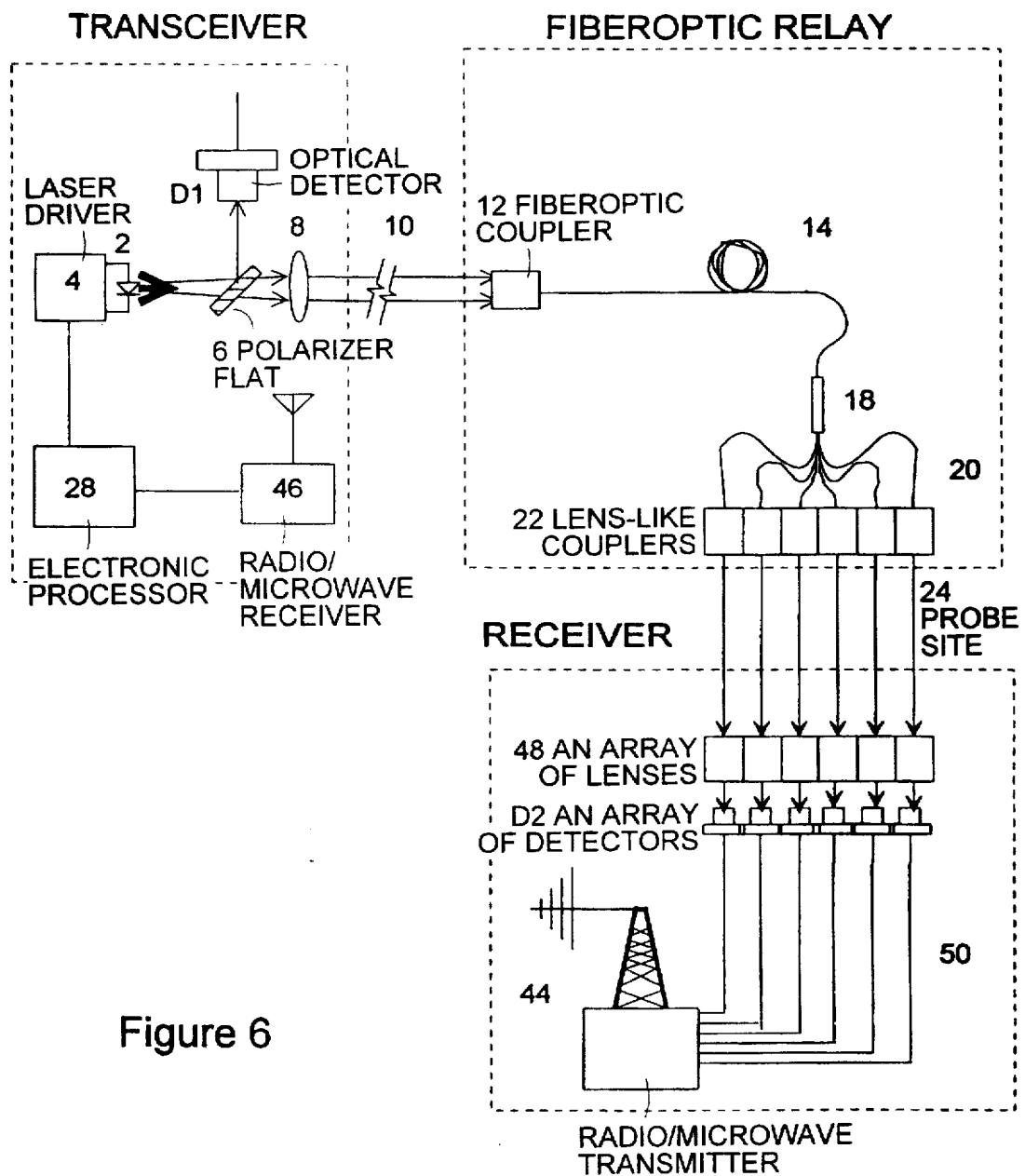
FIG. 6 is a schematic of a modified apparatus of FIG. 5 in which the laser beam directly impinges on an array of detectors.

Rather than transmitting an optical signal by radio or microwave as shown in FIG. 5, the optical signal may be converted to an electronic signal at the probe site and the electronic signal transmitted by radio or microwave to the moving vehicle as shown in FIG. 6. In this case, the optical signal crossing the probe site 24 passes through an array of lenses 48 which focus the laser beams onto an array of detectors D2 which generate an electronic signal which is conveyed via a multichannel cable 50 to the radio or microwave transmitter 44. The transmitted radio or microwave signal is received by the radio or microwave receiver 46 and then conveyed to the electronic processor 28.

In the preferred gain module shown in FIG. 7, a tree coupler 16 of the 1×2 type has one fiberoptic connected to a pigtailed solid-state detector 54. The generated electronic signal is amplified by an electronic amplifier 56, and is used to modulate via a bias-T 58 a pigtailed, semiconductor laser diode 60 which is driven at a continuous level by a laser driver 62. The laser pigtail is connected to one of the branches of a 1×2 tree coupler 32. Signal amplification in excess of 30 dB has been measured with this apparatus. An alternative gain module (not shown) is an erbium-doped fiberoptic amplifier.

Figure 8:
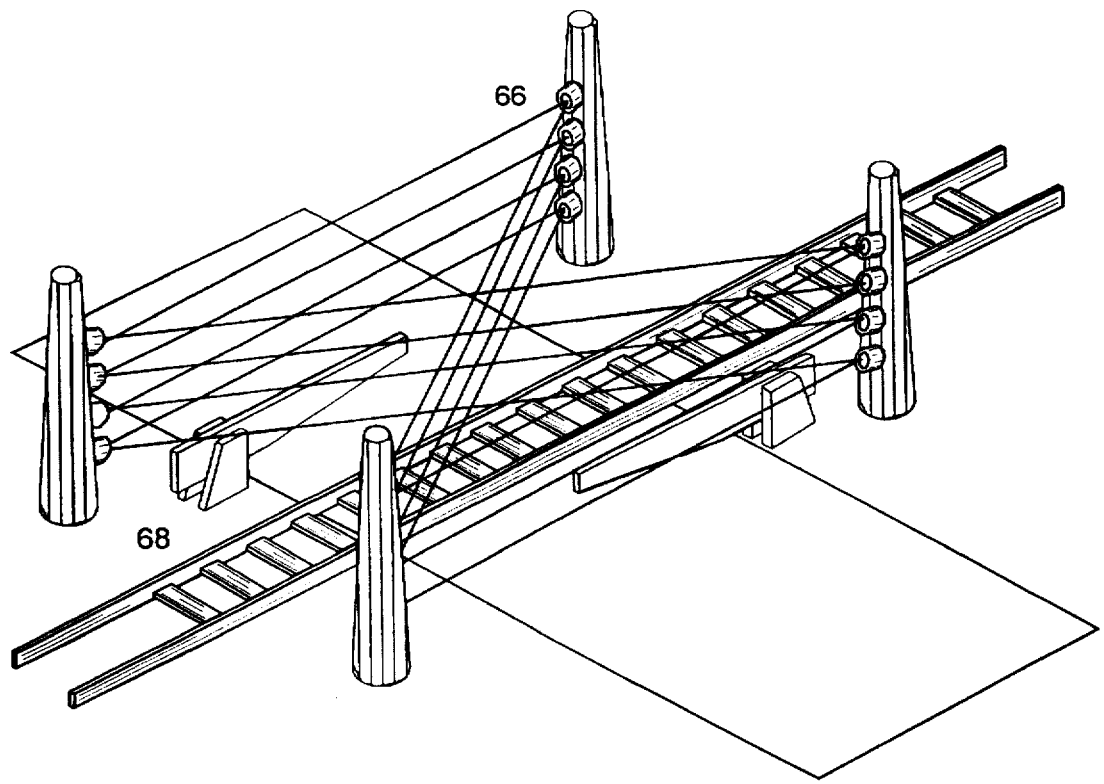
FIG. 8 is an illustration of the use. of the apparatus of the present invention at a grade crossing.

Another example of a railroad application is shown in FIG. 8 in which a grade crossing is monitored by the apparatus, detecting the presence of vehicles or personnel on the track. An eye-safe laser 66 is split several ways and launched across the grade crossing 68 so as to be incident on detectors which lie on the other side. The presence of an obstacle is registered as an obstruction to the laser beam.

A prototype apparatus was tested in the laboratory and in the field as described in the Examples below.

EXAMPLE 1

To test the invention two laboratory experiments and a field experiment were conducted. The laser source was a pulsed InGaAsP laser diode (E.G. & G, C86133E) emitting at the wavelength 1550 nm (1.55 µm). The laser was driven by a battery-fed power supply and emitted up to 5,000 pulses/sec at a maximum power of 40 W with pulsewidths of 25–50 nsec. The detectors used were of the InGaAs type and were connected to three-stage amplifiers. Throughout the experiments a single-mode fiberoptic was used. The fiberoptic was terminated on each end by a lens-containing coupler, comprising a down-collimating telescope and a pigtailed gradient refractive index (GRIN) lens.

In this example, a laser was aimed at the pigtailed GRIN lens from a distance of about 1 m. The fiberoptic cable was 4.5 km long and the outcoupled optical signals scanning the probe site were retroreflected from the site end, coupled back to the fiberoptic relay and traveled back to the transceiver.

In a parametric study a number of weather conditions were simulated, spanning the range between clear visibility and heavy snow. The simulation was accomplished by placing a series of neutral density filters in the path of the laser beam. The signal-to-noise ratio (SNR) was measured for a variety of conditions and yielded values in the range of 300-10. In all cases the signals were present when no obstacle was placed in the path and disappeared when an obstacle was present.

EXAMPLE 2

In a second laboratory experiment, the procedure of Example 1 was repeated using a field worthy prototype. At the exit end, the fiberoptic relay was split six ways on one of its ends via a 1×6 star coupler and the fiberoptic relay included a gain module in the direction of the returning signal. The gain module was bypassed in the direction of the launch signal. Past the 1×6 star coupler the transmitted signal propagated in six individual optical fibers. Each of the six fibers had an incremental length, thus providing a time delay of 100 ns between successive signals. At its exit the relay formed six parallel outcoupled beams, having an aperture of 10 cm each and covered a total width of 130 cm. The gain module was used to compensate for losses in the retroreflected signal due to the split loss and insertion losses. The gain module consisted of an analog repeater comprising a pigtailed detector, electronic amplifier, bias-T, pigtailed continuous wave (cw) diode laser and its driver. With an adequate gain the signal magnitude was elevated to a detectable level, so that at least a power of 1 μW reached the detector.

As in the first experiment, a parametric study was undertaken where the weather conditions were simulated by a series of neutral density filters. The measured SNR was greater than 10 for all the conditions. Very repeatedly and reliably signals were present when no obstacle was placed in the path and they disappeared once an obstacle was present.

EXAMPLE 3

The procedure of Example 2 was repeated in a field experiment conducted outdoors. A laser in a field-worthy (water-tight) prototype was aimed at the pigtailed GRIN lens from distances ranging from about 1 to 4 m. The fiberoptic cable was 4.5 km long and the outcoupled optical signals scanning the probe site were retroreflected from the site end, coupled back to the fiberoptic relay, and traveled back to the transceiver. The opto-mechanical subsystems were designed to withstand vibrations, high-speed winds, precipitation, and the deposition of grime. The components were aligned at the site without difficulty. The transceiver was enclosed in an impermeable box, which had a window for optical access. The box was mounted on a steel column, bolted to a concrete base. The bolting mechanism permitted several degrees of tilt and the column contained a swivel mechanism to permit alignment.

The resulting signals distinguished between the presence and absence of an obstacle in the path of the probe with a good signal to noise ratio. An alarm was always triggered when an obstacle was placed in the site and no false alarms occurred.

What is claimed is:

1. An electro-optic transportation warning system for examining a location in an intended path of a moving vehicle for a blockage when that location is not within the line-of-sight of the moving vehicle comprising: (i) a laser transceiver means to transmit a laser signal from the moving vehicle through air; (ii) a first fiberoptic coupling means to collect the laser signal through a collimating means to form a collimated signal; (iii) a fiberoptic cable to receive the collimated signal and transmit that signal to the location being examined; (iv) a second fiberoptic coupling means to receive the collimated signal at the location being examined, to split the signal into multiple signals to form a time delay amongst the multiple signals, and to pass the multiple signals across the intended path of the moving vehicle; (v) multiple laser signal receiving means; and (vi) a means to transmit receipt and non-receipt of a laser signal by the laser signal receiving means to the moving vehicle.

2. The warning system of claim 1, further comprising an alarm on the moving vehicle which is triggered if any one of the multiple signals is not received.

3. The warning system of claim 1, wherein the means for transmitting the receipt or non-receipt of each signal is retroreflection of each signal along the fiberoptic cable.

4. The warning system of claim 3, wherein the laser signal receiving means comprises three flat surfaces which form a mutually orthogonal corner having a parallelism of about 30 to 0.5 arc sec.

5. The warning system of claim 4, wherein the parallelism is about 1 arc sec or less.

6. The warning system of claim 3, further comprising a gain module to replicate the retroreflected laser signals to a higher optical intensity prior to transmission to the moving vehicle.

7. The warning system of claim 6 wherein the gain module comprises: (a) a pigtailed solid-state detector; (b) an electronic amplifier with a minimum bandwidth of 100 MHz, (c) a pigtailed laser emitting at the wavelength of 1.55 μm operating in a continuous-wave mode, and (d) a laser driver and a bias-T.

8. The warning system of claim 1, wherein the means for transmitting the receipt or non-receipt of each signal comprises a radio.

9. The warning system of claim 1, wherein the means for transmitting the receipt or non-receipt of each signal comprises a microwave.

10. The warning system of claim 1, wherein the means for transmitting the receipt or non-receipt of each signal comprises a second fiberoptic cable.

11. The warning system of claim 1, wherein signal loss due to reflectance in the fiberoptic cable is reduced to less than about 1%.

12. The warning system of claim 11, wherein the signal loss due to reflectance is reduced by coating the tips of the fibers with an anti-reflection coating.

13. The warning system of claim 12, wherein the anti-reflection coating comprises magnesium fluoride.

14. The warning system of claim 1, wherein the laser signal is at a wavelength in the range of about 1.5–2.1 micrometers (μm).

15. The warning system of claim 1, wherein the laser transceiver comprises a InGaAsP semiconductor laser-diode which emits laser pulses at a wavelength of about 1.55 μm.

16. The warning system of claim 1, wherein the laser signal is transmitted into air with an expansion angle of up to about 5°.

17. The warning system of claim 1, wherein the laser signal is transmitted into air with an expansion angle of about 1°.

18. The warning system of claim 1, wherein the laser signal is transmitted to the first fiberoptic coupling means through at least 1 meter of air.

19. The warning system of claim 1, wherein the laser signal is transmitted to the first fiberoptic coupling means through about 1 to 500 meters of air.

20. The warning system of claim 1, wherein the collimating means is a gradient refractive index lens.

21. The warning system of claim 1, wherein the collimating means is a microscope objective lens.

22. The warning system of claim 1, further comprising a second collimating means to collimate the laser signal received by the second coupling means prior to passing the multiple signals across the intended path of the moving vehicle.

23. A method for warning a moving vehicle of a blockage at a location in an intended path of the moving vehicle which location is out of the line-of-sight of the moving vehicle which comprises: (i) transmitting a laser signal from the moving vehicle through air, (ii) receiving the laser signal at a first fiberoptic coupling means within the line-of-site of the moving vehicle; (iii) collimating the received signal by passing it through a collimating means to form a collimated signal, (iv) transmitting the collimated signal through a fiberoptic cable to a second fiberoptic coupling means on one side of the intended path at the location; (v) splitting the collimated signal into multiple signals and forming a time delay amongst the multiple signals; (vi) passing each of the multiple signals to a separate laser signal receiving means located across the intended path at the location from the second fiberoptic coupling means; (vii) determining if each laser signal receiving means receives a laser signal, and (viii) transmitting receipt or non-receipt of each laser signal to the moving vehicle.

24. The method of claim 23, further comprising generating an alarm on the moving vehicle if any one of the multiple signals is not received.

25. The method of claim 23, wherein the transmitting of the receipt or non-receipt of each laser signal is by retroreflection of each laser signal along the fiberoptic cable.

26. The method of claim 25, wherein the laser signal receiving means comprises three flat surfaces which form a mutually orthogonal corner having a parallelism of about 30 to 0.5 arc sec.

27. The method of claim 26, wherein the parallelism is about 1 arc sec or less.

28. The method of claim 25, further comprising replicating the retroreflected laser signal to a higher optical intensity.

29. The method of claim 28, wherein the replicating is done by a gain module which comprises (a) a pigtailed solid-state detector, (b) electronic amplifier with a minimum bandwidth of 100 MHz, (c) a pigtailed laser emitting at the wavelength of 1.55 µm operating in a continuous-wave mode, and (d) a laser driver and a bias-T.

30. The method of claim 23, wherein the transmitting of the receipt or non-receipt is by radio.

31. The method of claim 23, wherein the transmitting of the receipt or non-receipt is by microwave.

32. The method of claim 23, wherein the transmitting of the receipt or non-receipt comprises coupling each laser signal into a second fiberoptic cable.

33. The method of claim 23, wherein signal loss due to reflectance in the fiberoptic cable is reduced to less than about 1%.

34. The method of claim 33, wherein the signal loss due to reflectance is reduced by coating the tips of the fibers with an anti-reflection coating.

35. The method of claim 34, wherein the anti-reflection coating comprises magnesium fluoride.

36. The method of claim 23, wherein the laser signal is at a wavelength of about 1.5–2.1 micrometers (µm).

37. The method of claim 23, wherein the laser signal is transmitted by a InGaAsP semiconductor laser-diode emitting pulses at a wavelength of about 1.55 µm.

38. The method of claim 23, wherein the laser signal is transmitted through air with an expansion angle of up to about 5°.

39. The method of claim 23, wherein the laser signal is transmitted through air with an expansion angle of about 1°.

40. The method of claim 23, wherein the laser signal is transmitted through at least 1 meter of air prior to being received at the first fiberoptic coupling means.

41. The method of claim 23, wherein the laser signal is transmitted through about 1 to 500 meters of air to the first fiberoptic coupling means.

42. The method of claim 23, wherein the collimating means is a gradient refractive index lens.

43. The method of claim 23, wherein the collimating means is a microscope objective lens.

44. The method of claim 23, further comprising collimating the laser signal received by the second coupling means prior to passing the multiple signals across the intended path of the moving vehicle.

* * * * *